Sept. 16, 1941.  E. D. RAPISARDA  2,255,986
APPARATUS FOR CONDITIONING CHOCOLATE OR THE LIKE
Original Filed Sept. 4, 1937  2 Sheets-Sheet 1

INVENTOR.
EDWARD D. RAPISARDA
BY
ATTORNEY.

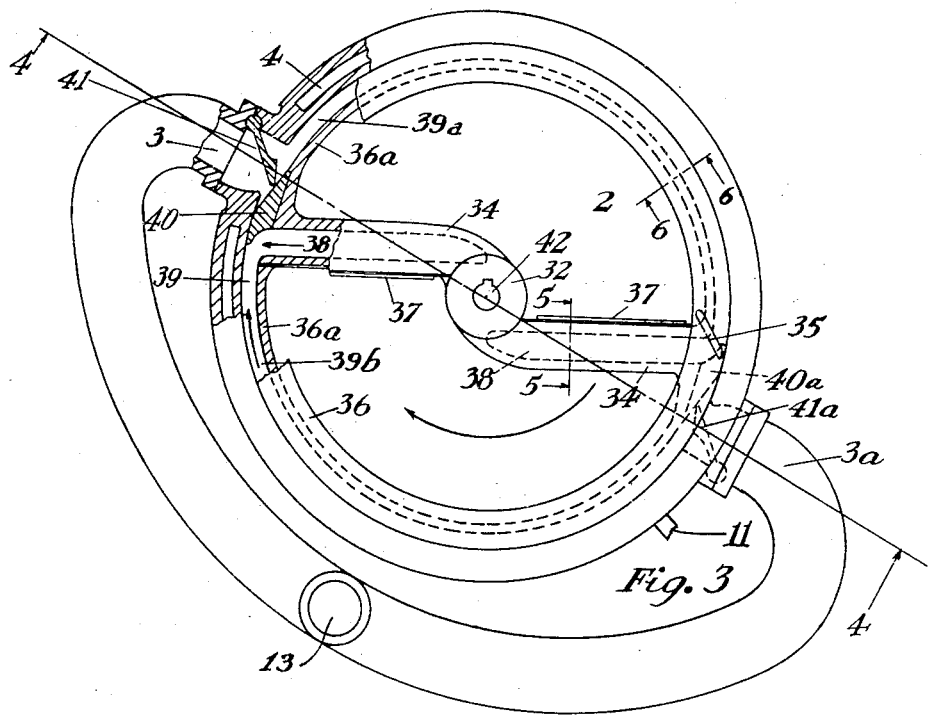
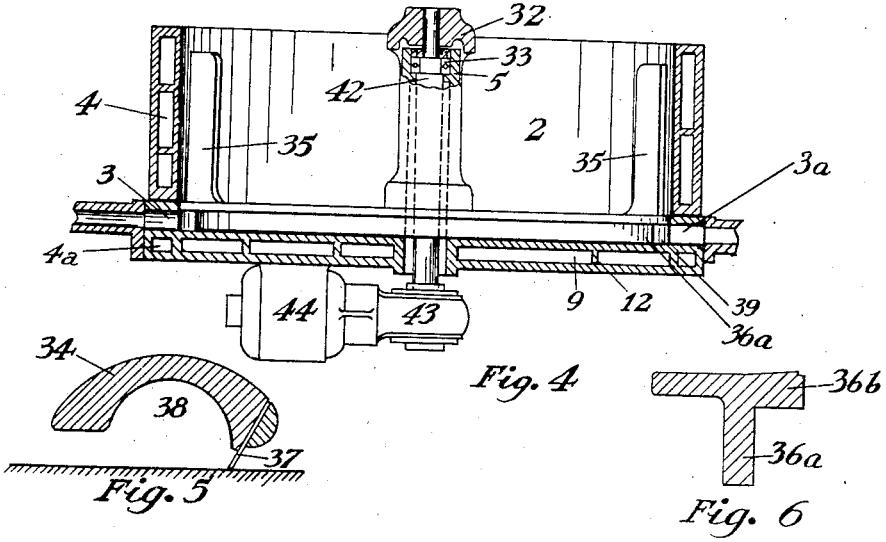

Patented Sept. 16, 1941

2,255,986

UNITED STATES PATENT OFFICE 2,255,986

APPARATUS FOR CONDITIONING CHOCOLATE OR THE LIKE

Edward D. Rapisarda, Agawam, Mass., assignor to Baker Perkins Company, Inc., Saginaw, Mich., a corporation of New York Original application September 4, 1937, Serial No. 162,560. Divided and this application December 4, 1939, Serial No. 307,871

3 Claims. (Cl. 257—4)

This invention relates to improved apparatus for the handling and conditioning, or tempering of chocolate or like materials employed in the manufacture of molded or coated confections, especially well adapted to the practice of my improved method of conditioning chocolate or like materials described and claimed in my copending United States application Serial No. 162,560, filed September 4, 1937, of which application this is a division. The term "chocolate" as used herein is, however, to be understood to embrace also confection materials, coatings, and icings of various other compositions presenting similar or analogous problems. The difficulties in handling these other materials, although not so frequent or acute, are also effectively overcome by the apparatus of this invention.

Tempering of chocolate has been accomplished in the past by various methods suitable to treatment of small quantities by hand methods, as by first melting the chocolate by slowly raising the temperature to a point not over ninety-six degrees Fahrenheit and then very gradually reducing the temperature to that desired for coating, about ninety degrees; by melting the chocolate at a higher temperature, say, one hundred twenty degrees Fahrenheit and very slowly bringing it down to the coating temperature, agitating it the while, or by mixing partially-set or "mushy" chocolate with warmer melted chocolate to distribute the solidified fat particles through the mass to produce the desired condition and temperature.

With the apparatus heretofore employed for handling large quantities of chocolate, proper tempering has not been attained, or when a supply of properly tempered chocolate has been placed in the enrober tank it has lost its temper by the time it has been deposited. In the enrobing apparatus generally used, for example, up to a thousand pounds of molten chocolate is held in a temperature-controlled reservoir and drawn from continuously for coating centers or depositing in molds. In these earlier reservoirs it has been sought to maintain the initial proper temper of chocolate by holding it in the reservoir at a definite temperature, say, ninety degrees, Fahrenheit, and by providing thermostatically-controlled means for alternately heating and cooling the walls of the reservoir and conduit to maintain that temperature. I have found that thus controlling the temperature only of the chocolate is unsatisfactory, and can not be otherwise, since during any period of heating most of the higher melting fat fractions must be entirely molten before the sensible heat of the chocolate can rise sufficiently to cause the control thermostat to interrupt the heat supply and cause cooling to take place. In other words, the heat added to the mass is absorbed as latent heat of fusion. Therefore, even though several hundred pounds of chocolate has been correctly tempered when first put into the reservoir, if that chocolate is used up at the rate of one hundred pounds an hour, several hours will elapse during which time the bulk of the chocolate will be subjected to heating or cooling, or alternations of both treatments, and the original condition of the chocolate will be altered during that period.

My invention overcomes all of the above difficulties in the mass production of confections by providing a novel apparatus for continuously tempering the chocolate immediately before it is deposited.

Other features and objects of the invention appear in the following specification and are illustrated in the accompanying drawings, in which—

Fig. 3 is a top plan view partly in section of the reservoir of Fig. 1, showing the agitating and impelling means of the invention;

Fig. 4 is a vertical cross-section through the reservoir, taken along line 4—4 in Fig. 3, showing the agitator and impeller means in side elevation;

Fig. 5 is a vertical section through a spoke of the agitator, taken along lines 5—5 of Fig. 3;

Fig. 6 is a vertical section through the rim of the agitator and impeller assembly taken along line 6—6 of Fig. 3.

Figure 1:
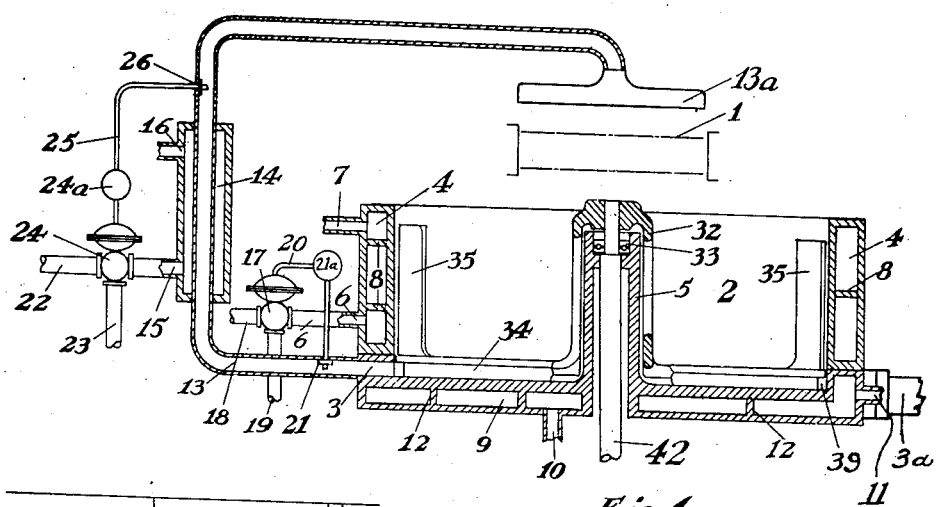
Fig. 1 is a vertical cross-section through chocolate enrobing or depositing apparatus according to the invention, showing diagrammatically chocolate tempering means and the controls therefor.

Referring to the drawings, particularly Fig. 1, an open-mesh, or perforated conveyor 1, shown diagramamtically, carries confection centers, biscuits, or other articles to be coated past an enrobing outlet or nozzle 13a of known form, also represented diagrammatically. Coating material, such as the chocolate of the instant description, is poured curtain-wise over the goods, the surplus draining through the conveyor into a supply tank 2 beneath the enrobing nozzle. (In molding solid confections, the conveyor 1 will carry mold pans beneath suitable valve controlled nozzles at 13a.)

The tank or reservoir 2 is cylindrical in form, of sufficient size to hold a substantial amount of chocolate, and (see Fig. 3), is provided with outlets 3, 3a at the bottom of the jacketed vertical side wall 4. A hollow center post 5 projects vertically from the bottom 9 above the highest level of the chocolate to support an agitator, described hereafter, and enclose its drive-shaft and journals.

The side wall of the tank 2 of Figs. 1 and 3 is equipped for heating to a predetermined temperature according to the method of my invention by the following means. Heating fluid is supplied to the jacketed hollow wall 4 through supply pipe 6 and is discharged therefrom through an outlet 7. Between inlet 6 and outlet 7 a helical baffle 8 is provided to direct the incoming heating fluid from inlet 6 around the circumference of the jacketed wall 4 in a helical path to the outlet 7, so that direct flow between the inlet and outlet is prevented and heat is distributed evenly over all parts of the face of the inner wall.

The circular bottom 9 of the container is jacketed for cooling over its entire horizontal area and for a short distance up the side wall of the reservoir. An inlet 10 is connected to a source of cooling liquid, which may conveniently be a city water supply. A spiral baffle 12 defines a spiral duct from inlet 10 near the center to an outlet 11 at the periphery of the jacketed bottom member, to insure uniform cooling of the entire bottom area.

The temperature of the side wall and bottom of the reservoir are controlled and regulated in accordance with the method here outlined briefly. The bulk of the chocolate in the tank 2 is kept at an even predetermined temperature by contact with the heated side wall 4, while its bottom layer is cooled by contact with the bottom portion 9 of the container. The cooled chocolate is, by means to be described, removed continuously from the bottom and is discharged through the outlets 3 and 3a to a conduit 13 leading to the enrobing or depositing nozzle. The heat of wall 4 is regulated by controlling in known manner the temperature or volume, or both, of the heating fluid supplied through inlet pipe 6. For purposes of illustration, Fig. 1 shows diagrammatically a thermostatic mixing valve 17 of known form connected to the supply pipe 16. Hot and cold water are supplied to the valve 17 by pipes 18 and 19, respectively.

Mixing valve 17 operates in known manner in response to changes in fluid pressure communicated through a duct 20 from a thermostat 21 to vary the proportions of hot and cold water supplied to the jacketed wall 4. The thermostat 21 is located in the conduit 13 close to the outlet 3, so that it increases or decreases the temperature of the wall 4 in response to changes in the temperature of the chocolate.

An adjustable control 21a (shown diagrammatically) permits adjustment of the temperature of the heating fluid supplied to the jacket 4, to vary the temperature of the material in reservoir 2. Thus the apparatus is adapted to handling chocolates or other materials of various compositions and melting points.

The flow of water into the jacketed bottom 9 may be adjusted manually by valve means not shown, according to the temperature of the water supply at a given time, so that the chocolate which is discharged past thermostat 21 at a uniform rate will be cooled to a desired temperature in accordance with the method to be described. Since during a given day or working period, the city water will not vary materially in its temperature, no automatic regulation of temperature or volume of the cooling water need ordinarily be provided.

In adjusting the supply of cooling water it is desirable to reduce its flow to the minimum, consistent with normal variations in its volume or temperature, necessary to cool the chocolate to the desired point. With the cooling effect of bottom 9 thus minimized, only a minimum of heat will be required at wall 4 to maintain a desired constant temperature of the chocolate at outlet 3.

As the cooled chocolate passes through conduit 13 it is reheated, before its delivery to the enrobing nozzle, by a heating jacket 14 enclosing a suitable area of conduit 13. Heating fluid is supplied to jacket 14 through a supply pipe 15 and is discharged therefrom through outlet 16. Warm water at a controlled temperature is supplied to pipe 15 by a second thermostatic mixing valve 24. Pipes 22 and 23 respectively supply hot and cold water to valve 24. The temperature of the warm water delivered by mixing valve 24 is controlled by a thermostat 26 which is located in conduit 13 at a point beyond the heated jacket 14, and which is connected to actuate the mixing valve by a fluid pressure line 25.

The temperature of the heating jacket 14 is adjusted by a manual control 24a of the thermostatic valve 24. The thermostat 26 is located and the thermostatic valve is adjusted so that just enough heat will be supplied to jacket 14 to raise the temperature of chocolate passing through conduit 13 to the desired temperature for storage prior to depositing and no higher, for instance, to 90 degrees.

As an alternative to the thermostatic mixing valves 17 and 24 and their associated controls, a supply of hot water may be connected to the jacketed walls 4 or 14, and the temperature of those jackets may be regulated by a thermostatically-regulated flow-control valve governed in known manner by the thermostats 21 and 26 located and arranged as shown. Given a supply of hot water at a reasonably constant temperature and pressure, it is possible with the use of these valves to regulate satisfactorily the temperature of jackets 4 and 14 by controlling the rate of flow only of the hot water.

Figure 2:
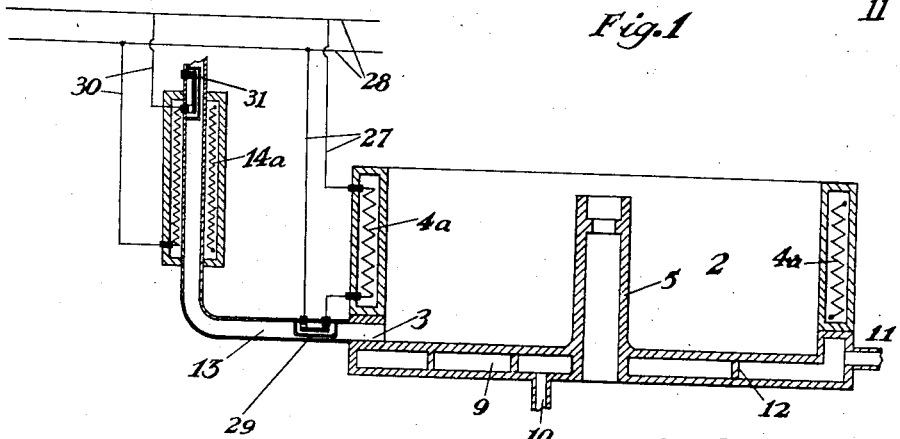
Fig. 2 is a diagrammatic vertical cross-sectional view of a modification of the apparatus of Fig. 1.

Fig. 2 shows diagrammatically a modification of the temperature-controlled chocolate receptacle and conduit. In this apparatus the side wall of the tank 2 is provided with electrical heating resistors 4a arranged and interconnected in known manner to apply heat evenly over the wall area. The resistors 4a, indicated diagrammatically, are connected in a circuit 27, which in turn is connected to a main power line 28. The flow of heating current to the resistors 4a is governed as in the fluid-heated apparatus of Fig. 1, by the temperature of the chocolate leaving the cooled jacketed bottom of the receptacle 2. A thermostatic switch 29 of known kind is located in conduit 13 adjacent the outlet from the receptacle and is connected in circuit 27 to govern the supply of electricity to resistors 4a.

An electric conduit heater 14a operates and is controlled similarly to the jacketed heater 14 of Fig. 1. The resistors of heater 14a are supplied with current from a circuit 30, which in turn is connected to power line 28. The current supplied to the heater is governed by a thermostatic switch 31 connected in circuit 30 and located in conduit 13 beyond the heating zone.

The operation of the apparatus of Fig. 2 is similar to that shown in Fig. 1 and described below.

In connection with the apparatus described above, Figs. 3 through 6 show a novel agitating and impeller mechanism, which both stirs the chocolate in the container 2 to maintain its homogeneity and distribute heat through it uniformly, and removes cooled chocolate continuously from the bottom of the receptacle and pumps it through outlet 3 and conduit 13 to the depositing nozzle 13a. While this improved agitator and impeller is particularly adapted to practice of the method of my invention, it may also be employed advantageously in confection conditioning apparatus of earlier types, and may also be used wherever heavy viscous fluids or mixtures must be stored and mixed in a receptacle and discharged continuously therefrom.

Referring to Figs. 1, and 3 through 6 of the drawings a cylindrical sleeve or hub 32 is journaled in bearings 33 at the top of the center post 5. It forms the subject-matter of my copending application Serial No. 399,312, filed June 23, 1940. The hollow hub 32 encloses the center post 5 and at its bottom carries two radial arms or spokes 34, which extend tangentially from the circumference of the hub 32. At its outer end each spoke 34 carries a vertical scraper 35, which at its outer edge travels in close proximity to the inner wall of the receptacle. Blades 35 are set at an angle to the side wall 4 to stir the heated chocolate horizontally inwardly of the receptacle to mix it with the mass of chocolate. Their vertical leading edges also act to raise the chocolate and spread it on the face of the wall.

Spokes 34 at their outer ends carry a circular rim 36, which is T-shaped in cross-section, as shown in Figs. 3 and 6. The outer portion of the horizontal web 36b of the rim and its vertical web 36a co-operate with the side wall and the bottom of the tank 2 to define an annular channel 39 extending around the circumference of the receptacle. Each spoke 34 is provided at its rearward edge with a scraper blade 37 (see Fig. 5) adapted for scraping engagement with the bottom 9 of the receptacle. Each spoke is U-shaped in transverse section throughout its length to define an inverted channel 38 and the leading edge of each spoke is spaced from the bottom of the receptacle approximately one-half inch, so that the forward edge will just clear the cooled bottom layer of chocolate. The inverted U-shaped channel 38 of each spoke 34 opens through vertical web 36a of the rim to communicate with the circumferential channel 39.

Just ahead of the juncture of each channel 38 with channel 39 a stop 40, 40a is fixed to the rim 36 and formed and positioned to block off the channel 39, dividing it into two semi-circular portions 39a and 39b. The leading face of each stop 40 is beveled tangentially to the outer periphery of vertical web 36a, so that it is adapted to engage and displace outwardly either of two hinged gate valves 41 and 41a at outlets 3, 3a (see Fig. 3). Each gate valve is pivoted on a vertical axis and is urged yieldingly inwardly by spring means, not shown, so that it bears against the outer periphery of vertical web 36a to close off semi-circular channel 39a or 39b and divert chocolate from that channel into its associated outlet 3 or 3a.

The hub 5 and the agitator assembly comprising spokes 34, rim 36, and the associated parts, are driven by a vertical shaft 42 journaled axially in the hollow center post 5. At its lower end shaft 42 is coupled to a reduction gear 43 driven by a motor 44 of known kind.

In operation the agitator and impeller assembly are driven clockwise in Fig. 3, causing the blades 35 to stir the mass of chocolate in the receptacle continuously away from the heated side wall. At the same time the scraper blades 37 on spokes 34 continuously remove the cooled lower layer of chocolate from the bottom 9 of the receptacle and gather it into the U-shaped channels 38.

Rotation of the tangential spokes 34 causes the chocolate in channels 38 to be deflected and urged continuously outwardly into the annular channel 39. As rim 36 and stops 40 revolve they carry with them the outwardly displaced chocolate in the channel 39 to outlets 3 and 3a where the gates 41 and 41a direct it through branch ducts into conduit 13 through which it flows to the enrobing nozzle or flow-pan 13a (see Fig. 1). The pumping action described is similar to that of a rotary displacement pump.

The upper surface of each spoke 34 is faired or streamlined behind its leading edge so that the chocolate immediately above the bottom layer is displaced by passage of the blade with a minimum of mixing action. Thus as the bottom layer of chocolate is removed from the container, the said layer next above replaces it and in turn settles into contact with the cool bottom, without being stirred into the hotter chocolate above.

Having described the mechanical elements of the improved apparatus in its various phases, and their operation, I will now briefly describe its operation according to the method of my copending application.

Assuming that the particular chocolate being handled may best be applied to the goods at 90 degree Fahrenheit, a supply of previously melted chocolate at 90 degrees or more is placed in the reservoir 2. Alternatively, solid chocolate may be initially melted in the tank by injection of steam or hot water into the jacketed bottom 9.

As described above, heat is applied to the jacketed side wall 4 or 4a to keep the molten chocolate in the desired uniformly fluid condition, and cooling water is circulated through the bottom 9 of the tank. The temperature of the side wall is regulated by setting thermostat 21 to produce a predetermined desired temperature of the cooled "mushy" chocolate leaving outlet 3 after contact with the cooled bottom 9. This temperature is preferably as much lower than the enrobing temperature (here 90 degrees) as possible, to insure that the greatest latent heat of fusion shall be extracted from the chocolate, but not so low as to permit undue freezing of the chocolate on the agitator blades 35 or in conduit 13. With most chocolates I have found that a temperature of from 85 to 87 degrees is satisfactory.

The thermostat 21, or 29, in Fig. 2, is therefore adjusted, and the volume of cooling water flowing to inlet 10 of the jacketed bottom 9 is regulated so that the bulk of the chocolate in the tank 2 is held at a temperature of 90 to 92 degrees Fahrenheit. For the greatest economy of both heating and cooling mediums the volume of cooling water supplied to the bottom of the tank should be adjusted to the least amount which will insure sufficient cooling effect through possible minor variations in flow or temperature of the water supply. The "mushy" chocolate at a temperature of 85 to 87 degrees Fahrenheit has a substantial part of its fat content partly solidified, high melting fractions being dissolved and/or dispersed as minute crystals in the fluid fractions having lower melting points. Constant motion of the chocolate in channel 38, in annular passage 39, and in conduit 13 keeps the particles small and suspended so that neither the fluidity nor the smoothness of the chocolate is impaired. In this state the chocolate is impelled through conduit 13 past the heating jacket (14 or 14a). The thermostat (26 or 31) controlling the heat of this jacket is adjusted to regulate the heat supplied to the jacket so that the chocolate in the conduit will just attain the desired pouring temperature of 90 degrees as it leaves the heating zone.

In this condition and at this temperature it flows to the flow pan or depositing nozzle 13a in known manner. Because of the small diameter of conduit 13, the chocolate travels through it relatively rapidly, and therefore it is not held at the final depositing temperature for any appreciable length of time. It therefore absorbs very little latent heat of fusion, the added heat raising the sensible temperature of the fluid chocolate only, without melting the suspended fat crystals to any material extent.

In enrobing apparatus heretofore available it has been customary alternately to heat and cool both a supply tank and the associated outlet conduit in response to thermostatic control devices to maintain a constant temperature. Thus during operation the chocolate about to be deposited was being either cooled down from a temperature above the desired enrobing temperature, or heated up to that point from a temperature only slightly lower. This alternation of heating and cooling was due to the lag inherent in thermostatic equipment, and affected the chocolate as follows: Assume that the sensible heat had risen to 91 degrees, causing the thermostat to turn off the heat supply and turn cooling medium into the tank and conduit jacket. The chocolate would swiftly drop in temperature to 89 degrees, the liquid portions losing their heat first, and reducing the sensible heat affecting the thermostatic element. As soon as the temperature reached this point, the thermostatic means would cause heating medium to be applied to the jacket surfaces, checking any slight solidification of cocoa butter occurring during the brief cooling period. During the ensuing heating period, any solidified particles would then absorb heat by melting, and delay the rise in temperature of the chocolate to 91 degrees, which again would turn off the heat supply. The net effect was thus that of a prolonged heating at 90 or 91 degrees, melting all fat fractions having lower melting points, resulting shortly in the absorption by the chocolate of the maximum amount of latent heat of fusion possible at the pouring temperature. Thus even though the chocolate was properly tempered when placed in the tank, it was soon de-tempered by the continued heating, and since its temperature was at no time lowered materially below 90 degrees, the desirable solid fat particles originally present were never recrystallized.

Furthermore, in the previous apparatus, in order to effect the quick-acting close control of temperature desired, it was necessary to provide means for alternately cooling and heating any given receptacle wall or conduit jacket, wherein temperature control was to be effected. This necessitated the provision of automatic thermostatically controlled means for regulating both the flow of a heating medium, such as steam, and a refrigerated cooling medium, such as ice water, with a resultant complexity of thermostat and valve equipment entirely avoided in my improved apparatus.

In the apparatus here described it is necessary to provide heating means only for the vertical wall of the storage receptacle and for the conditioning jacket on the conduit 13, together with two thermostats and associated valves or switches to control the application of heat only in these places.

Because the heating, cooling, and reheating are performed in separate zones, it is not necessary to provide means for rapidly cooling or heating any part of the apparatus to widely differing temperatures. Since the bulk of the chocolate in the receptacle is warmed to a constant temperature at or only slightly above the desired temperature for use, and since the heating surfaces are never cooled, heating medium need not be supplied in large quantity or at high temperature. Similarly, since only a small proportion of the total volume of the chocolate is cooled at any one time, and the cooling surface is never heated, the inexpensive moderately cool water available in public water systems may be used. A substantial saving is thus effected in reduced heating and cooling costs over the earlier used apparatus for conditioning chocolate.

While I have shown and described a specific apparatus particularly adapted to the conditioning of chocolate, the apparatus may be modified, or it may be used for materials other than chocolate, without departing from the invention.

Finally, the apparatus shown and described may be used advantageously for treating confection materials other than chocolate. Fondant comprising sugars of different crystallizing properties may be treated to prevent graining or sandy texture. Agitating and initial cooling of such material to a point below the solidification temperature, with subsequent brief reheating to the desired depositing temperature in accordance with the invention serves to remove latent heat of crystallization, which otherwise slows the cooling process and encourages the formation of large sugar crystals.

Icings and sugar coatings used for biscuits and bon bons, consisting of a mixture of powdered sugar and fat, present the same problem as chocolate, and my apparatus is useful in treating such materials also. With this last class of material the range of temperatures employed at the different steps in the process may be selected in each case to suit the range of melting points characteristic of the particular fat employed.

Having thus described my invention, what I claim and desire to secure by Letters Patent is:

1. Apparatus for conditioning chocolate and the like comprising in combination, a cylindrical reservoir having upright side walls and a circular bottom, outlet means from the reservoir adjacent the bottom, means for heating said side walls, means for cooling said bottom, agitator means and pump means for removing cooled chocolate from said bottom and impelling it through said outlet, thermostatic means for controlling the temperature of the side walls in response to the temperature of the chocolate, and conduit means connecting said outlet to a point of use of the chocolate, means for applying heat to the walls of said conduit, a thermostat in said conduit beyond said heating means, and means operable responsive to said thermostat for controlling the temperature of said conduit heating means.

2. In apparatus for the storage, conditioning, and depositing of chocolate or like material, in combination, a reservoir for storing said chocolate, means for heating said reservoir, a cooling zone for receiving chocolate heated in said reservoir, means for supplying cooling medium to said cooling zone, a conduit leading from said cooling zone to depositing means, and means for impelling chocolate from said cooling zone to said depositing means, temperature control means in said conduit adjacent said cooling zone connected to control the heating means of said reservoir to maintain the temperature of the chocolate therein predeterminedly above the temperature of the chocolate leaving said cooling zone, reheating means associated with said conduit between cooling zone and said depositing means, and temperature control means in said conduit beyond said reheating means and connected to control the temperature of said reheating means to heat the cooled chocolate quickly to the temperature desired for depositing without holding it at that temperature for any substantial time.

3. Apparatus as claimed in claim 2, wherein the side walls of the reservoir are heated and the bottom is cooled, and the rim of said agitator carries blade means positioned to stir the upper portion of the fluid horizontally inward from said heated side wall.

EDWARD D. RAPISARDA.